United States Patent
Lentsch et al.

(10) Patent No.: US 11,327,151 B2
(45) Date of Patent: May 10, 2022

(54) RANGING TECHNOLOGY USE FOR ULTRA-BROADBAND COMMUNICATION IN MILLIMETER WAVE COMMUNICATION SYSTEMS

(71) Applicant: NXP B.V., Eindhoven (NL)

(72) Inventors: Thomas Lentsch, Stallhofen (AT); Ghiath Al-Kadi, Graz (AT)

(73) Assignee: NXP B.V., Eindhoven (NL)

( * ) Notice: Subject to any disclaimer, the term of this patent is extended or adjusted under 35 U.S.C. 154(b) by 373 days.

(21) Appl. No.: 16/449,557

(22) Filed: Jun. 24, 2019

(65) Prior Publication Data

US 2020/0400777 A1    Dec. 24, 2020

(51) Int. Cl.
*G01S 7/00* (2006.01)
*H01Q 5/25* (2015.01)
(Continued)

(52) U.S. Cl.
CPC .............. *G01S 7/006* (2013.01); *G01S 3/50* (2013.01); *G01S 13/765* (2013.01);
(Continued)

(58) Field of Classification Search
CPC ............ H04B 7/0617; H04B 5/02; H04B 2201/71634; H04B 1/7163; H04B 1/71637; H04B 7/04; H04B 1/3833; H04W 84/12; H04W 24/02; H04W 64/00; H04W 88/06; H04W 4/02; H04W 88/08; H04W 84/18; H04W 12/63; H04W 76/10;
(Continued)

(56) References Cited

U.S. PATENT DOCUMENTS 7,133,646 B1 *  11/2006  Miao .................... H04B 1/38
                                                455/73
7,995,644 B2 *  8/2011   Sahinoglu ............ H04B 1/7163
                                                375/221
(Continued)

OTHER PUBLICATIONS

Zafer Sahinoglu, Sinan Gezici, Zhi Tian, Georgios B. Giannakis, Hisashi Kobayashi, Andreas Molisch, H. Vincent Poor, Localization via Ultra-Wideband Radios, IEEE Signal Processing Magazine, Jul. 2005, pp. 70-84. (Year: 2005).*

(Continued)

*Primary Examiner* — Olumide Ajibade Akonai

(57) ABSTRACT

A base station includes a millimeter wave communication unit coupled to an impulse radio ultra-wideband (IR-UWB) communication unit. The millimeter wave communication unit is capable of being wirelessly coupled to user-equipment using a millimeter wave communication link. Based on a determination as to whether the user-equipment is configured for IR-UWB ranging and localization, an IR-UWB communication link is established between the base station and user-equipment for IR-UWB ranging and localization. When the IR-UWB communication link is established for IR-UWB ranging and localization, the ranging and localization associated with the millimeter wave communication unit is disabled and the millimeter wave communication link is used for data communication maximizing throughput by utilizing localization and ranging information provided by the IR-UWB communication link.

20 Claims, 3 Drawing Sheets

(51) Int. Cl.
| | |
|---|---|
| *H04W 76/10* | (2018.01) |
| *G01S 3/50* | (2006.01) |
| *G01S 13/76* | (2006.01) |
| *G01S 13/87* | (2006.01) |
| *H04B 1/3827* | (2015.01) |

(52) U.S. Cl.
CPC ............. *G01S 13/878* (2013.01); *H01Q 5/25* (2015.01); *H04B 1/3833* (2013.01); *H04W 76/10* (2018.02)

(58) Field of Classification Search
CPC .. H04W 64/006; G01S 5/0009; G01S 5/0257; G01S 5/00; G01S 7/006; G01S 5/02; G01S 5/14; G01S 5/06; G01S 5/0205; G01S 5/0289; G01S 13/765; G01S 13/878; G01S 3/50; G01S 5/10; H01Q 5/25
See application file for complete search history.

(56) References Cited

U.S. PATENT DOCUMENTS

| | | | |
|---|---|---|---|
| 2009/0213901 A1 | 8/2009 | Berens | |
| 2013/0154836 A1* | 6/2013 | Derrico | G01S 5/0273 340/572.1 |
| 2014/0218236 A1* | 8/2014 | Sadeghi | H04B 7/00 342/367 |
| 2015/0214617 A1* | 7/2015 | Shang | H01Q 1/52 343/722 |
| 2016/0056950 A1* | 2/2016 | Leong | H04L 43/0864 370/354 |
| 2019/0113599 A1* | 4/2019 | Maceraudi | G01S 5/0215 |
| 2019/0289568 A1* | 9/2019 | Pajovic | G01S 5/00 |

OTHER PUBLICATIONS

Dayang Lin, Andreas Trasser, Hermann Schmacher, A Fully Differential IR-UWB Front-end for Noncoherent Communication and Localization, 2011 IEEE International Conference on Ultra-Wideband (ICUWB), pp. 116-120. (Year: 2011).*

Saad et al., "High Accuracy Location Estimation for a Mobile Tag using One-way UWB Signaling", Ubiquitous Positioning, Indoor Navigation, and Location Based Service (UPINLBS), Oct. 3, 2012, pp. 1-8, IEEE.

Hakusui, Shigeaki, "Fixed Wireless Communications at 60GHz Unique Oxygen Absorption Properties", RF Globalnet; Apr. 10, 2001; «https://www.rfglobalnet.com/doc/fixed-wireless-communications-at-60ghz-unique-0001», 4 pages.

Seco-Granados, G. et al., "Positioning with 5G mmWave Massive-MIMO Systems," Presentation, Summer School on 5G V2X Communication, Jun. 11, 2018; «https://nms.kcl.ac.uk/toktam.mahmoodi/v2x-summer-school/slides/Day-1/GG-5G%20positioning%20_%205G%20V2X%20Summer%20School%20%20KCL2018.pdf», 55 pages.

* cited by examiner

RANGING TECHNOLOGY USE FOR ULTRA-BROADBAND COMMUNICATION IN MILLIMETER WAVE COMMUNICATION SYSTEMS

BACKGROUND

Millimeter wave wireless communication systems typically spend a relatively large amount of time and transmission power performing ranging and localization operations for wireless devices connected to the millimeter wave communication system. Having millimeter wave communication systems allocate significant time on ranging and localization, instead of data transmission, can hinder the millimeter wave communication system's ability to maximize throughput for user data. Thus, there exists a need to provide a millimeter wave communication system with improved data bandwidth capabilities.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
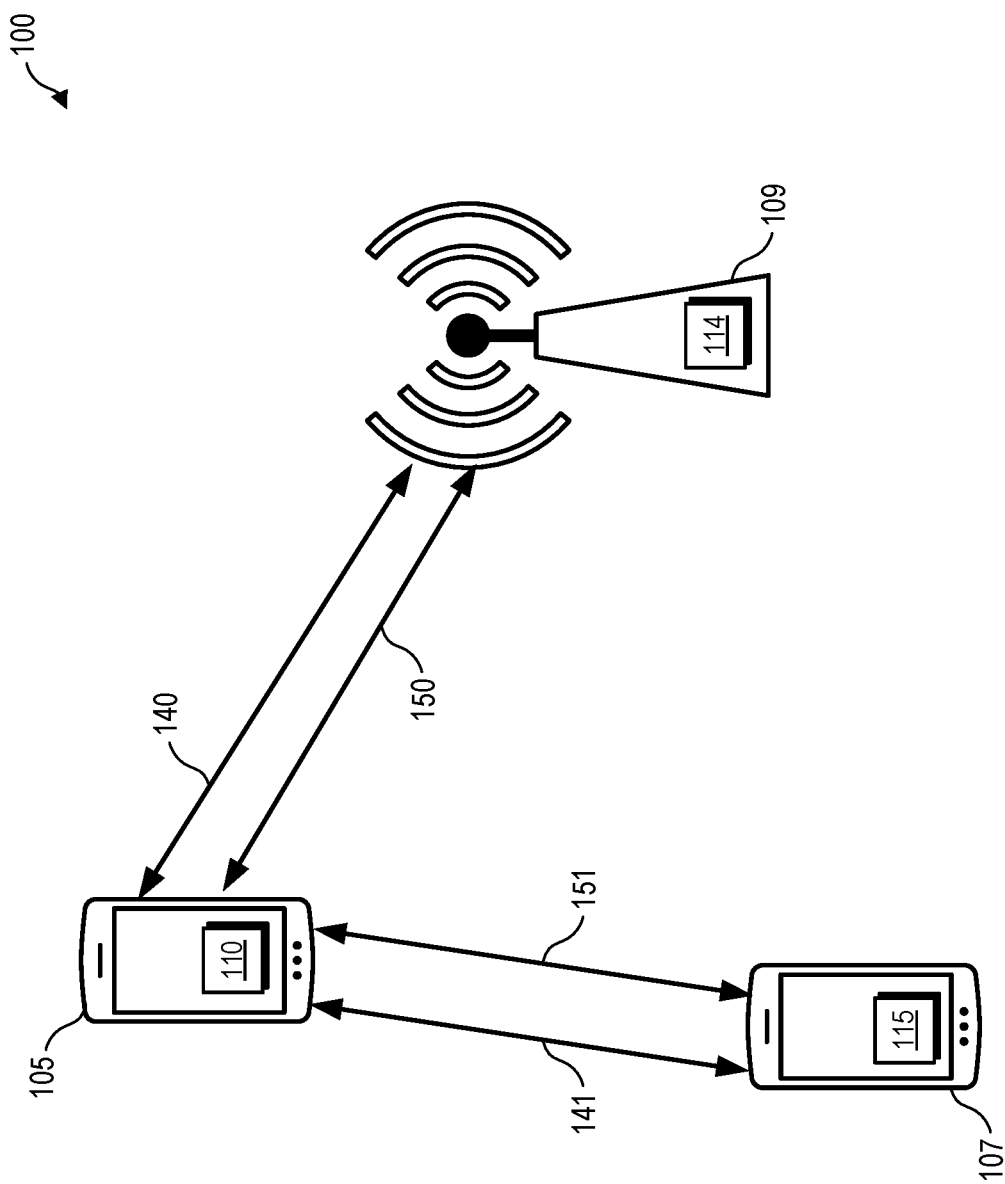
FIG. 1 is a block diagram of a wireless communication system in accordance with some embodiments.
Figure 2:
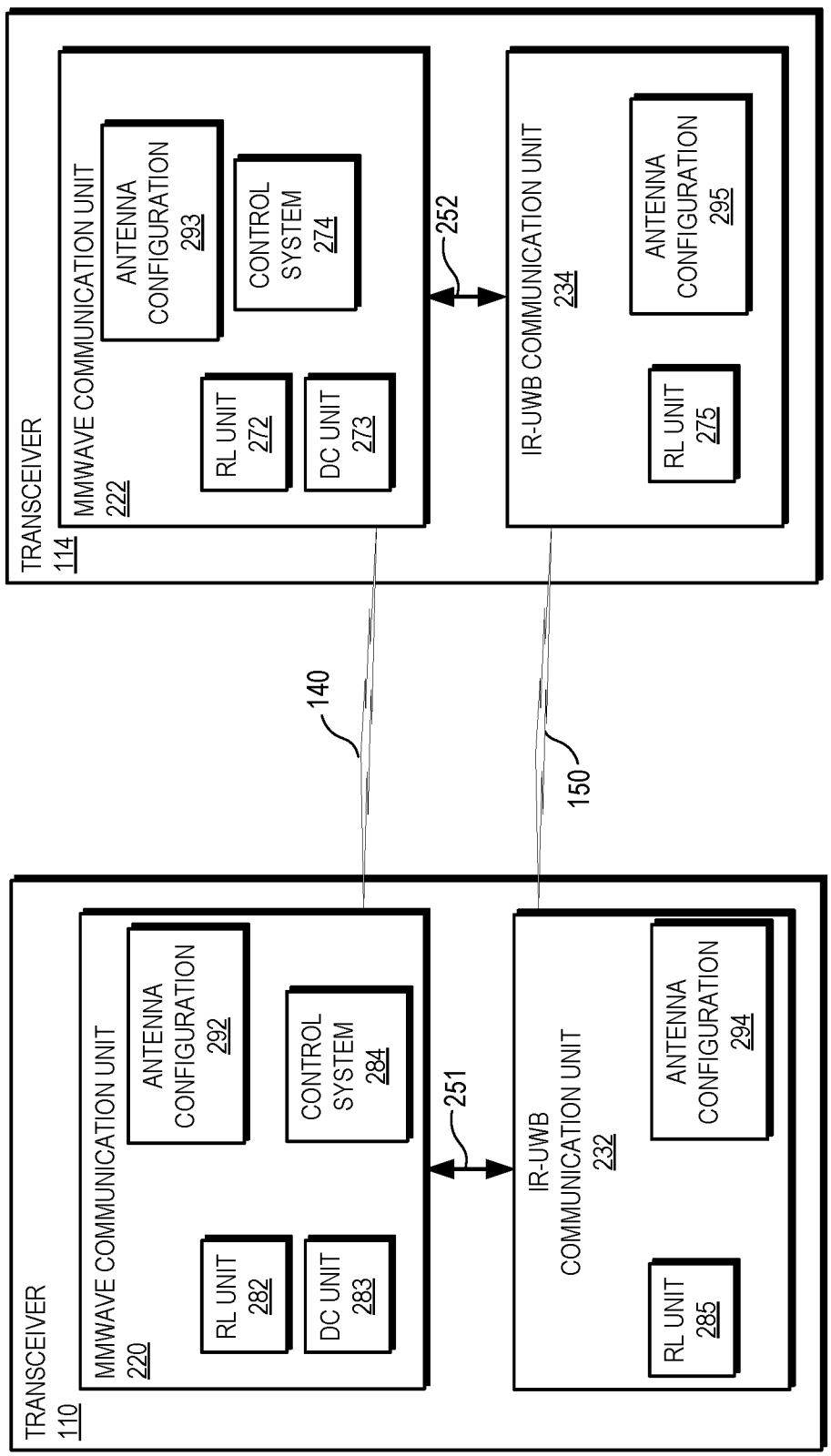
FIG. 2 is a block diagram of transceivers utilized in the wireless communication system in FIG. 1 in accordance with some embodiments.
Figure 3:
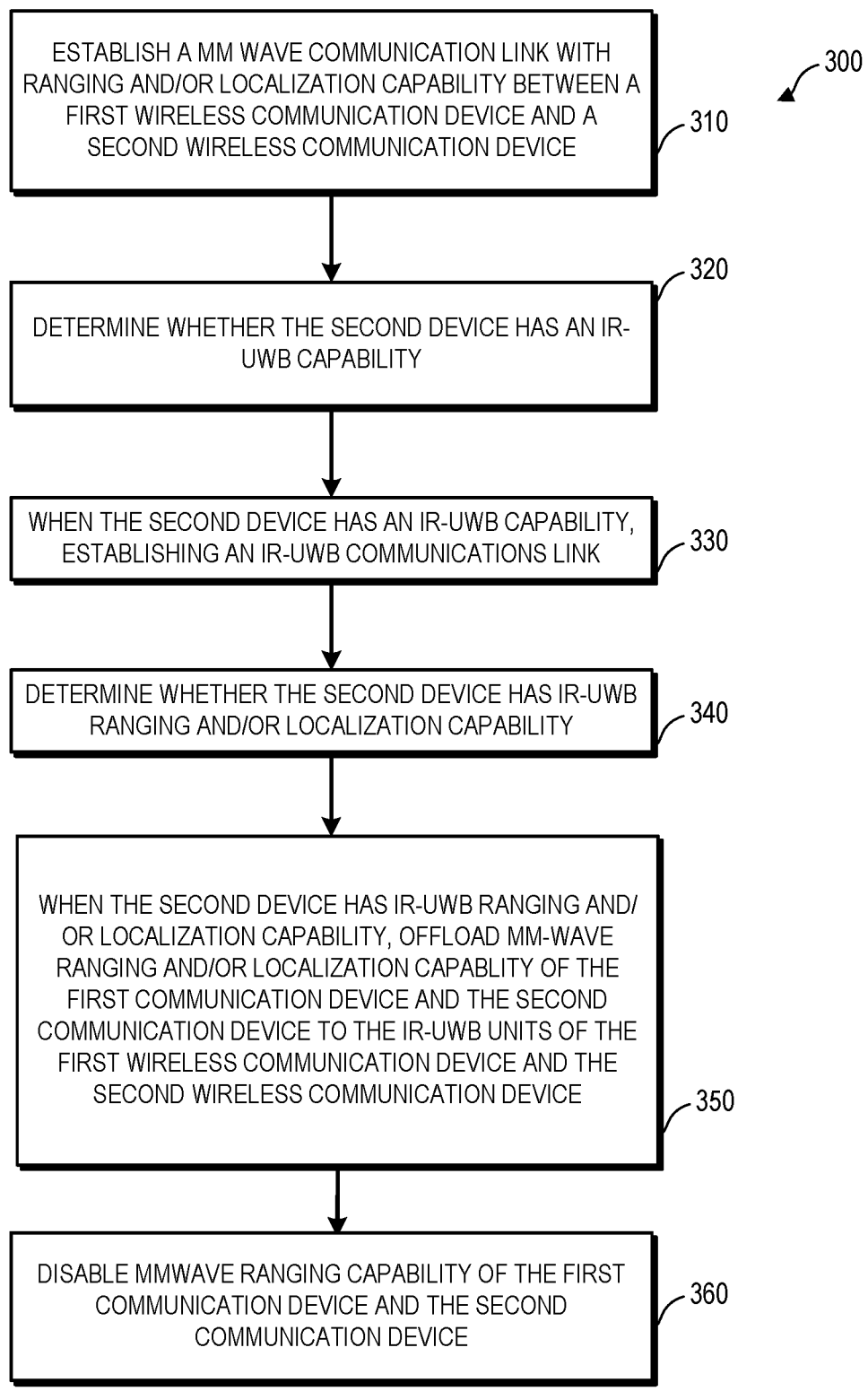
FIG. 3 illustrates a flow diagram of a method of switching from millimeter wave ranging and localization capabilities to impulse radio ultra-wideband (IR-UWB) ranging and localization capabilities in the wireless communication system of FIG. 1 in accordance with some embodiments.

FIGS. 1-3 illustrate systems and techniques for switching from millimeter wave ranging and localization capabilities to impulse radio ultra-wideband (IR-UWB) ranging and localization capabilities in a wireless communication system. As referenced in FIGS. 1-3, ranging is the action of estimating the distance between wireless communication devices in the wireless communication system, whereas localization is the action of determining the position of a wireless communication device (location finding) in the wireless communication system. For millimeter wave communication, due to the physical propagation characteristics of the millimeter waves, precise relative position information of such communication devices is required to allow for maximum communication data rate between the communication devices. Thus, millimeter wave communication systems depend on aligning the beams of the transceiver antennas in order to maximize signal exchange or data communication between the antennas, which in this case is aided by the use of IR-UWB ranging and localization. Switching from millimeter wave ranging and localization to IR-UWB ranging and localization is dependent upon whether the wireless communication devices facilitating communication are IR-UWB capable. Using IR-UWB capable wireless devices for ranging and localization allows the corresponding wireless devices to offload millimeter wave ranging and location finding capabilities normally associated with, for example, a millimeter wave based base station, to the IR-UWB units of the IR-UWB capable devices, thereby allowing the millimeter wave portion of the base station to focus on non-ranging and non-localization activities, maximizing throughput of data transfer by utilizing localization and ranging information provided by the IR-UWB communication link.

FIG. 1 illustrates a wireless communication system 100 in accordance with various embodiments. The wireless communication system 100 includes a base station 109, user-equipment (UE) 105, and UE 107. Base station 109 includes a transceiver 114. UE 105 includes a transceiver 110. UE 107 includes a transceiver 115. The wireless communication devices (e.g., base station 109, UE 105, and UE 107) of wireless communication system 100 are configured to operate at various frequencies using several wireless communication standards. For example, base station 109, UE 105, and UE 107 may be configured for impulse radio ultra-wideband (IR-UWB) communication to operate at 4224-4752 MHz, 7392-7920 MHz and 7920-8448 MHz for the IEEE 802.15.4z standard. For millimeter wave communication, base station 109, UE 105, and UE 107 may be configured to operate between 24 GHz and 300 GHz utilizing, for example, the 5G or IEEE 802.11ad standards.

During operation, base station 109, which is equipped with both millimeter wave and IR-UWB communication capability, broadcasts a control signal to determine whether UE 105 is configured to establish an IR-UWB communications link 150 with base station 109. Prior to, during, or after transmission of the control signal to UE 105, base station 109 may have established a millimeter wave communications link 140 with UE 105 with ranging and localization capabilities as is well known in the art. In various embodiments, whether UE 105 is configured to establish the IR-UWB communications link 150 depends on whether UE 105 is equipped with an IR ultra-wideband communications unit (such as, for example, the IR-UWB communication unit 232 depicted in FIG. 2.

After base station 109 determines that UE 105 is equipped with an IR ultra-wideband communications unit, base station 109 establishes the IR-UWB communications link 150 with UE 105 and activates ranging and localization functionalities of base station 109 and UE 105. An IR-UWB communications link 150 is established when both base station 109 and UE 105 are capable of receiving and transmitting IR signals according to, for example, the IEEE 802.15.4 standard as is known in the art. Once base station 109 has established the IR-UWB communications link 150 and activated the ranging and localization functionalities of base station 109 and UE 105, base station 109 disables the ranging and localization functionality of base station 109 corresponding to the millimeter wave communications link 140 and provides a notification to UE 105 to disable the ranging and localization functionality of UE 105 corresponding to the millimeter wave communications link 140. Once the millimeter wave ranging and localization functionality of base station 109 and UE 105 have been disabled, the IR-UWB communication units of base station 109 and UE 105 continue the ranging and localization operations that were previously conducted by the millimeter wave communications units of base station 109 and UE 105 and millimeter wave communication can be dedicated to data transmission maximizing throughput of data transfer by utilizing localization and ranging information provided by the IR-UWB communication link.

In various embodiments, during operation, instead of the base station 109 broadcasting the control signal to determine whether to establish an IR-UWB communications link, UE 105 broadcasts the control signal to determine whether base station 109 or UE 107 are configured to establish an IR-UWB communications link 150 or IR-UWB communications link 151. In various embodiments, whether base station 109 or UE 107 is configured to establish the IR-UWB communications link 150 or IR-UWB communications link 151 depends on whether base station 109 or UE 107 is equipped with an IR ultra-wideband communications unit.

Similarly, after UE 105 determines that base station 109 or UE 107 is equipped with an IR ultra-wideband communications unit, UE 105 establishes the IR-UWB communications link 150 or IR-UWB communications link 151 with base station 109 or UE 107. Once UE 105 establishes the IR-UWB communications link 150 or IR-UWB communications link 151, UE 105 disables the ranging and localization functionality of UE 105 corresponding to the millimeter wave communications link 140 and millimeter wave communications link 141 and provides a notification signal to base station 109 or UE 107 to disable the ranging and localization functionality of base station 109 or UE 107 corresponding to the millimeter wave communications link 140 and millimeter wave communications link 141. Once the millimeter wave ranging and localization functionality of UE 105, base station 109, and UE 107 have been disabled, the IR-UWB communication units of UE 105, base station 109, and UE 107 continue the ranging and localization operations normally conducted by the millimeter wave communications unit of UE 105, base station 109, and UE 107 and millimeter wave communication can be dedicated to data transmission maximizing throughput of data transfer by utilizing localization and ranging information provided by the IR-UWB communication link.

FIG. 2 illustrates transceiver 110 and transceiver 114 of wireless communication system 100 of FIG. 1. Transceiver 110 includes a millimeter wave communication unit 220 and an IR-UWB communications unit 232. Transceiver 114 includes a millimeter wave communication unit 222 and an IR-UWB communication unit 234. In various embodiments, transceiver 110 and transceiver 120 are configured to perform both millimeter wave communication using millimeter wave communication unit 220 and millimeter wave communication unit 222 (via millimeter wave communications link 140) and IR-UWB communication using IR-UWB communication unit 232 and IR-UWB communication unit 234 (via IR-UWB communications link 150). That is, during millimeter wave communication, transceiver 110 is wirelessly coupled to transceiver 114 via millimeter wave communications link 140 using antenna configuration 292 and antenna configuration 293. During IR-UWB communication, transceiver 110 is wirelessly coupled to transceiver 114 via IR-UWB communications link 150 using antenna configuration 292 and antenna configuration 295. Thus, transceiver 110 and transceiver 114 are configured to operate using millimeter wave standards, such as 5G, IEEE 802.11ad standards and IR-UWB standards, such as, IEEE 802.15.4z standard.

With reference to FIG. 1, during operation of the wireless communication system 100, transceiver 114 of base station 109 initiates IR-UWB communication with transceiver 110 of UE 105 using a control signal in order to determine whether base station 109 can establish an IR-UWB communication link between the transceiver 110 and the transceiver 114. That is, IR-UWB communication unit 234 uses antenna configuration 295 to transmit the control signal to transceiver 110 to determine whether transceiver 110 has an IR-UWB communication unit with ranging and localization capability, such as, for example, IR-UWB communication unit 232 with antenna configuration 294.

When IR-UWB communication unit 234 determines that transceiver 110 has an IR-UWB communication unit 232 with ranging and localization capability, IR-UWB communication unit 234 establishes IR-UWB communications link 150 with IR-UWB communication unit 232. After the IR-communications link 150 has been established, transceiver 114 initiates the ranging and localization functionality of IR-UWB communication unit 234. Once the ranging and localization functionality of transceiver 114 is active, IR-UWB communication unit 234 provides a disable millimeter wave ranging and localization signal 252 to millimeter wave communication unit 222 to disable millimeter ranging and localization operations related to transceiver 114 and perform only data transmission operations with transceiver 110 maximizing throughput of data transfer by utilizing localization and ranging information provided by the IR-UWB communication link.

In order to disable the millimeter range operations of transceiver 114, IR-UWB communication unit 234 is configured to provide the disable millimeter wave ranging and localization signal 252 to the control system 274 of millimeter wave communication unit 222. The disable millimeter wave ranging and localization signal 252 provides an indication to the control system 274 of millimeter wave communication unit 220 to disable the ranging and localization (RL) unit 272, while continuing the data communication provided by data communication unit 273 to transceiver 110.

In order to signal to transceiver 110 of UE 105 that millimeter wave RL unit 282 is to be disabled, a flag bit is provided to IR-UWB communication unit 232. The flag bit is located in the header of the packet sent to IR-UWB communication unit 232 to establish the IR-UWB communications link 150 and is configured indicate to IR-UWB communication unit 232 to notify millimeter wave communication unit 220 to disable millimeter wave ranging operations performed by, for example, RL unit 282. Based on the flag bit provided by IR-UWB communications unit 234 to IR-UWB communication unit 232, IR-UWB communication unit 232 provides a disable millimeter wave ranging and localization signal 251 to the control system 284 of millimeter wave communication unit 220. The disable millimeter wave ranging and localization signal 251 provides an indication to the control system 284 of millimeter wave communication unit 220 to disable the RL unit 282, while continuing the data communication provided by data communication unit 283 to transceiver 114, maximizing throughput of data transfer by utilizing localization and ranging information provided by the IR-UWB communication link.

In various embodiments, millimeter wave communication unit 220 and millimeter wave communication unit 222 may continue to utilize millimeter wave ranging operations related to other millimeter wave devices that are wirelessly connected to either transceiver 110 or transceiver 114.

In various embodiments, millimeter wave communication unit 220 and millimeter wave communication unit 222 are configured to perform ranging and localization operations when, for example, transceiver 110 does not have IR-UWB communication capability. Thus, using millimeter wave communication unit 220 and millimeter wave communication unit 222, the positioning information of transceiver 114 is obtained based on a positioning reference signal of transceiver 110 as is known in the art. In one embodiment, for example, transceiver 114 (which may be, for example, base station) may transmit a positioning reference signal to transceiver 110 (which may be, for example, user equipment). Then, upon reception of the positioning reference signal, transceiver 114 determines a time of arrival (TOA) or time difference of arrival (TDOA) information associated with the positioning reference signal that would be communicated to transceiver 110. Finally, transceiver 114 computes the distance to transceiver 110 based on the received TOA or TDOA.

In various embodiments, IR-UWB communication unit 232 and IR-UWB communication unit 234 are configured to perform ranging and localization using standard IR-UWB ranging and localization techniques known in the art. For example, IR-UWB communication unit 232 and IR-UWB communication unit 234 may be configured to utilize the time-of-flight technique, which is a technique used to determine the distance between two objects or markers on objects. Using this technique, the transmitters of transceiver 110 or 114 transmit a waveform (commonly a chirp or a pulse), which is retransmitted by the other transceiver. Based on the amount of time it takes the retransmitted signal to reach the originating transceiver's (transceiver 110 or transceiver 114) receiver, the distance between the objects can be calculated.

In another example, IR-UWB communication unit 232 and IR-UWB communication unit 234 may be configured to utilize the angle-of-arrival technique, which is a technique used to measure the angle of arrival of the transmitted signal. That is, each transceiver (transceiver 110 or transceiver 114) may determine the angle of arrival of a signal or signals transmitted by the opposing transceiver. In various embodiments, the same signal may be received three times by the receiving transceiver's antennas or antenna configuration, which may be, for example, a 3-dimensional antenna of transceiver 110. A 3-dimensional antenna or antenna configuration (e.g., antenna configuration 292, antenna configuration 293, antenna configuration 294, and antenna configuration 295) may be defined as an antenna with three orthogonal axes x, y, and z. The difference between the three axes of the antenna of the signal received indicates the direction between transceiver 114 and transceiver 110. Thereby, and in conjunction with the distance determined by measuring the time-of-flight between them the originating transceiver's (transceiver 114) location can be determined within a 360-degree sphere around the transceiver 110.

FIG. 3 illustrates a method 300 of switching between millimeter wave ranging and localization capabilities to IR-UWB ranging and localization capabilities in wireless communication system 100 of FIG. 1 according to various embodiments. With reference to FIGS. 1 and 2, at block 310, a millimeter wave communication link 140 with ranging and localization capability is established between base station 109 and UE 105. The millimeter wave communication link 140 is established using millimeter wave communications unit 222 and millimeter wave communication unit 220, respectively. At block 320, transceiver 114 of base station 109 determines whether UE 105 has IR-UWB capability. When transceiver 114 determines that UE 105 has IR-UWB capability, at block 330, IR-UWB communication unit 234 of transceiver 114 establishes IR-UWB communications link 150 with IR-UWB communication unit 232 of transceiver 110. At block 340, IR-UWB communication unit 234 determines whether IR-UWB 232 has ranging and localization capability by, for example, determining whether a ranging bit is set to ranging as is known in the art. At block 350, when UE 105 has ranging and localization capability, millimeter wave ranging and localization capability is offloaded to IR-UWB communication unit 234 of base station 109 and IR-UWB communication unit 232 of UE 105. At block 360, millimeter wave communication unit 222 and millimeter wave communication unit 220 disable the ranging and localization capability of transceiver 114 and transceiver 110 by disabling RL unit 272 and RL unit 282, respectively. Thereby, allowing base station 109 and UE 105 to utilize the millimeter wave communication unit 222 and millimeter wave communication unit 220 of transceiver 114 and transceiver 110 primarily for data communication, while using the IR-UWB communication unit 234 and IR-UWB communication unit 232 for ranging and localization.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A transceiver, comprising:
a millimeter wave communication unit; and
an impulse radio ultra-wideband (IR-UWB) communication unit coupled to the millimeter wave communication unit,
wherein based on an initiation of IR-UWB ranging and localization capabilities of the transceiver, the transceiver utilizes the IR-UWB communication unit for ranging and localization and the millimeter wave communication unit for data transmission,
wherein the IR-UWB communication unit is configured to conduct ranging and localization via an IR-UWB communication link and the millimeter wave communication unit is configured to conduct data transmission via a millimeter wave communication link, and
wherein ranging and localization capability associated with the millimeter wave communication link is disabled when the IR-UWB communication link for ranging and localization is established.

2. The transceiver of claim 1, wherein:
the IR-UWB communication link is used to measure a time-of-flight (ToF) of a communication signal transmitted and received back by the transceiver.

3. The transceiver of claim 1, wherein:
the IR-UWB communication link is used to measure an angle-of-arrival of a communication signal received by the transceiver.

4. The transceiver of claim 1, wherein:
the IR-UWB communication link is used to measure a difference of time-of-arrival of a communication signal received by the transceiver.

5. The transceiver of claim 1, wherein:
the IR-UWB communication unit establishes the IR-UWB communication link.

6. The transceiver of claim 5, wherein:
the IR-UWB communication unit has an IR-UWB communication antenna configuration with a three-dimensional characteristic that is used for the IR-UWB communication link.

7. The transceiver of claim 1, wherein:
the millimeter wave communication unit provides the millimeter wave communication link.

8. The transceiver of claim 7, wherein:
the millimeter wave communication unit has a millimeter wave antenna configuration with a three-dimensional characteristic that is used to establish the millimeter wave communication link.

9. A method, comprising:
establishing a millimeter wave communication link between a first transceiver and a second transceiver;
determining whether the second transceiver is configured for impulse radio ultra-wideband (IR-UWB) ranging and localization; and
based on whether the second transceiver is configured for IR-UWB ranging and localization, establishing an IR-UWB communication link between the first transceiver and the second transceiver for ranging and localization, and
when the IR-UWB communication link between the first transceiver and the second transceiver for ranging and localization is established, disabling ranging and localization capabilities associated with the millimeter wave communication link.

10. The method of claim 9, further comprising:
utilizing the millimeter wave communication link as a primary data communication link.

11. The method of claim 9, further comprising:
measuring a time-of-flight (ToF) of a communication signal transmitted from the first transceiver to the second transceiver and back to the first transceiver using the IR-UWB communication link.

12. The method of claim 9, further comprising:
measuring an angle-of-arrival of a communication signal transmitted between the first transceiver and the second transceiver using the IR-UWB communication link.

13. The method of claim 9, further comprising:
measuring a difference of time-of-arrival of a communication signal transmitted from the first transceiver and the second transceiver using the IR-UWB communication link.

14. The method of claim 9, further comprising:
using a first IR-UWB communication unit and a second IR-UWB communication unit to establish the IR-UWB communication link.

15. The method of claim 9, further comprising:
using a first millimeter wave communication unit and a second millimeter wave communication unit to establish the millimeter wave communication link.

16. A base station, comprising:
a millimeter wave communication unit capable of being wirelessly coupled to user-equipment using a millimeter wave communication link;
an impulse radio ultra-wideband (IR-UWB) communication unit coupled to the millimeter wave communication unit wherein, based on a determination as to whether the user-equipment is configured for IR-UWB ranging and localization, an IR-UWB communication link is established between the base station and user-equipment for IR-UWB ranging and localization, and wherein ranging and localization associated with the millimeter wave communication unit is disabled and the millimeter wave communication link is used for data communication utilizing localization and ranging information provided by the IR-UWB communication link.

17. The base station of claim 16, wherein:
the IR-UWB communication link is used to measure a time-of-flight (ToF) of a communication signal transmitted and received back by the transceiver.

18. The base station of claim 16, wherein:
the IR-UWB communication link is used to measure an angle-of-arrival of a communication signal received by the transceiver.

19. The base station of claim 16, wherein:
the IR-UWB communication link is used to measure a difference of time-of-arrival of a communication signal received by the transceiver.

20. The base station of claim 16, wherein:
the millimeter wave communication unit includes a millimeter wave antenna configuration with a three-dimensional characteristic that is used to establish the millimeter wave communication link.

\* \* \* \* \*